United States Patent
Komiyama et al.

(10) Patent No.: US 12,452,538 B2
(45) Date of Patent: Oct. 21, 2025

(54) IMAGING SYSTEM, AND CONTROL APPARATUS AND IMAGING APPARATUS CONSTITUTING SAME

(71) Applicant: CANON KABUSHIKI KAISHA, Tokyo (JP)

(72) Inventors: Tomoaki Komiyama, Kanagawa (JP); Yuki Yamamoto, Tokyo (JP); Koyo Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 18/350,476

(22) Filed: Jul. 11, 2023

(65) Prior Publication Data
US 2024/0022821 A1    Jan. 18, 2024

(30) Foreign Application Priority Data

Jul. 12, 2022  (JP) .................................. 2022-111883
Sep. 16, 2022  (JP) .................................. 2022-148289

(51) Int. Cl.
  *H04N 23/695*  (2023.01)
  *G06T 7/20*    (2017.01)
  *H04N 23/62*   (2023.01)
  *H04N 23/661*  (2023.01)

(52) U.S. Cl.
  CPC ............ *H04N 23/695* (2023.01); *G06T 7/20* (2013.01); *H04N 23/62* (2023.01); *H04N 23/661* (2023.01); *G06T 2207/10016* (2013.01)

(58) Field of Classification Search
  None
  See application file for complete search history.

(56) References Cited

U.S. PATENT DOCUMENTS

| 2010/0277596 | A1* | 11/2010 | Nakamura | G01S 3/7865 |
| | | | | 348/169 |
| 2016/0094793 | A1* | 3/2016 | Westmacott | H04N 23/61 |
| | | | | 348/159 |
| 2017/0163881 | A1* | 6/2017 | Oshima | H04N 23/69 |
| 2019/0306408 | A1* | 10/2019 | Hofer | H04N 23/90 |
| 2024/0056686 | A1* | 2/2024 | Tsunashima | H04N 23/61 |

FOREIGN PATENT DOCUMENTS

| JP | 2005086360 A | 3/2005 |
| JP | 2022002378 A | 1/2022 |

* cited by examiner

*Primary Examiner* — Rebecca A Volentine
(74) *Attorney, Agent, or Firm* — Canon U.S.A., Inc., IP Division

(57) ABSTRACT

A control apparatus includes an input unit to which receives an image, a first detection unit configured to detect an object from the received image, a second detection unit configured to detect a start of movement of the detected object, and a control unit configured to, in a case where the start of movement is detected, control an imaging range of an imaging apparatus based on a position of the detected object for a predetermined time, and stop controlling the imaging range based on the position of the detected object after a lapse of the predetermined time.

16 Claims, 9 Drawing Sheets

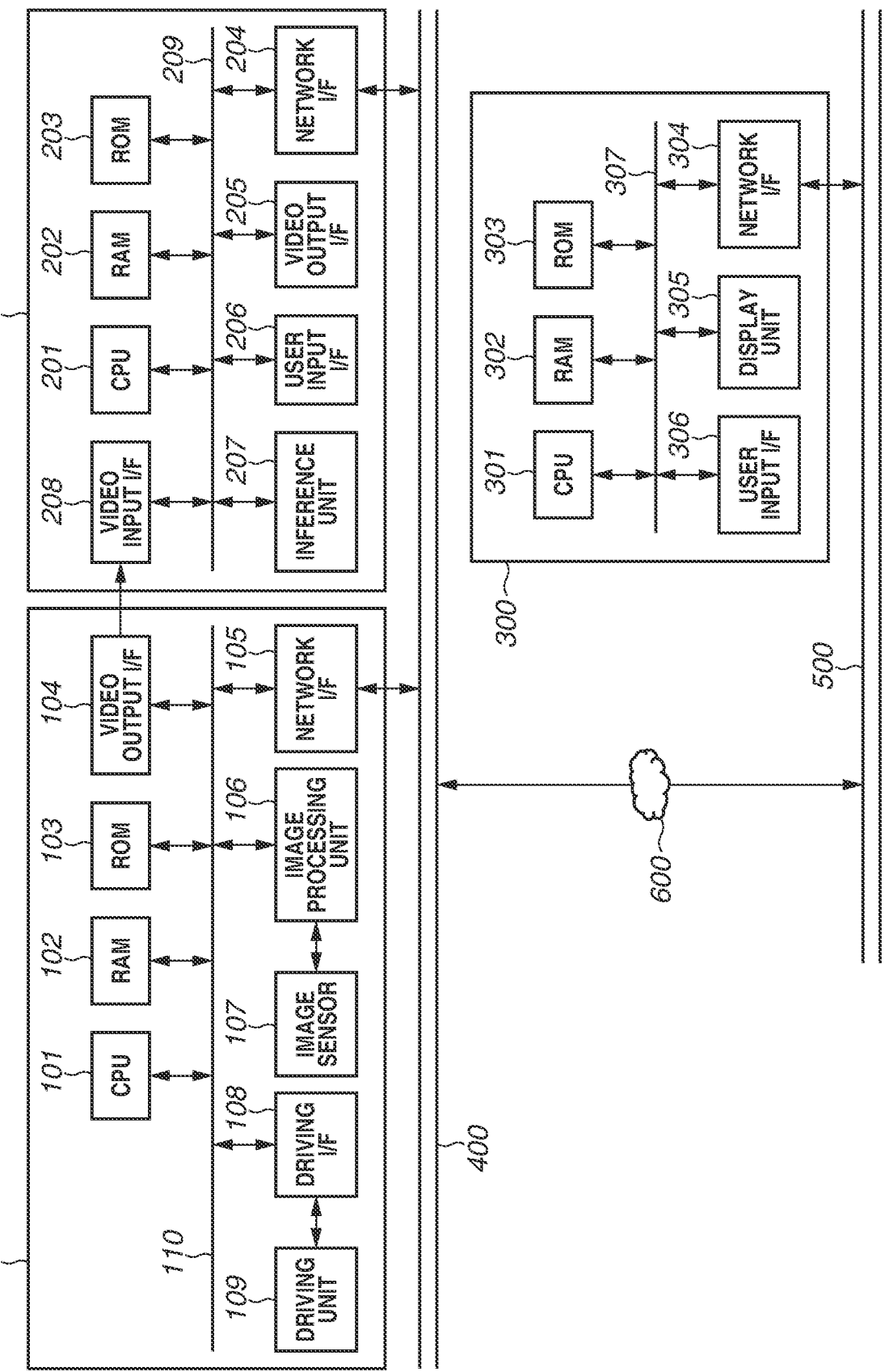

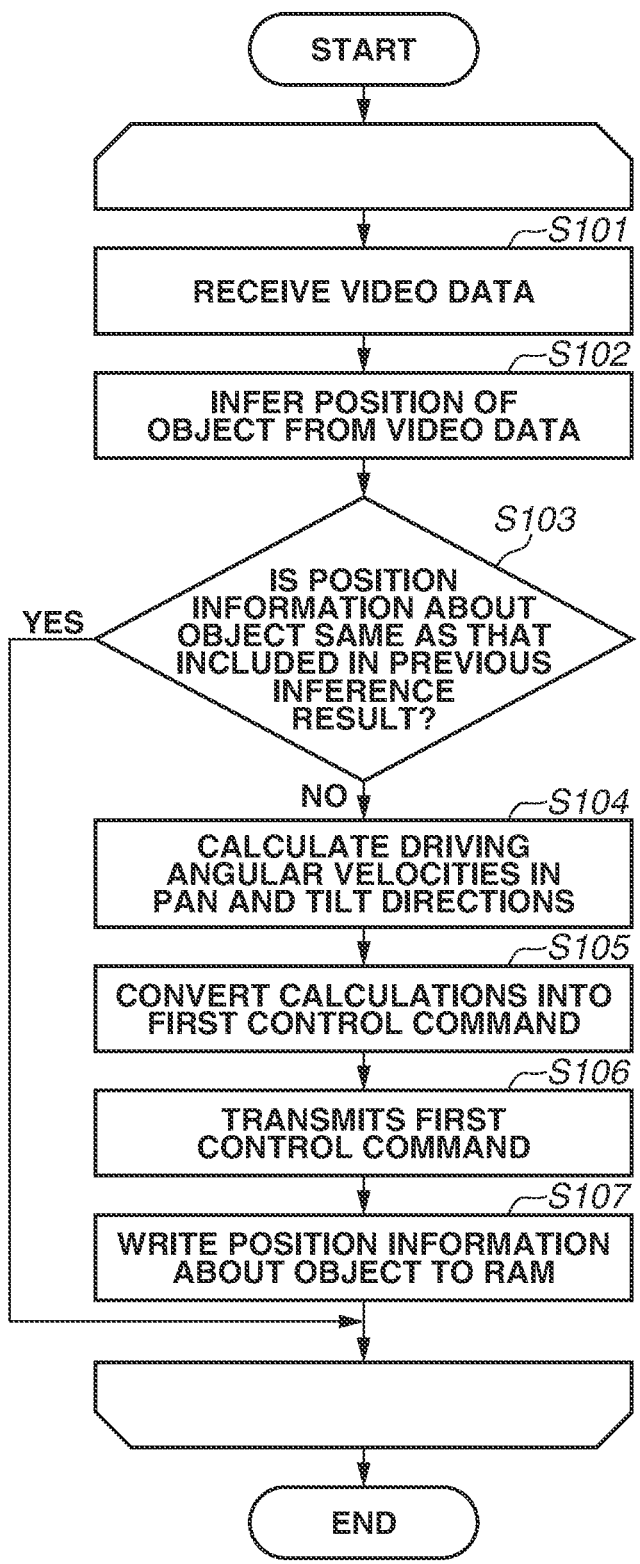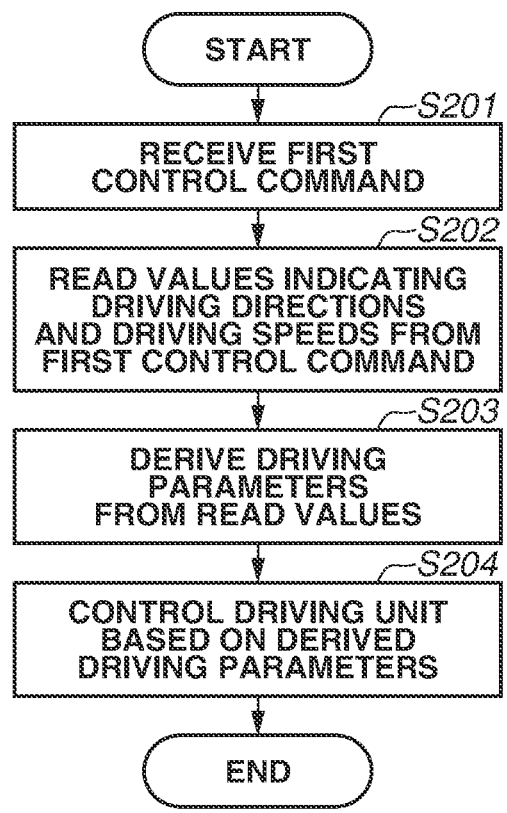

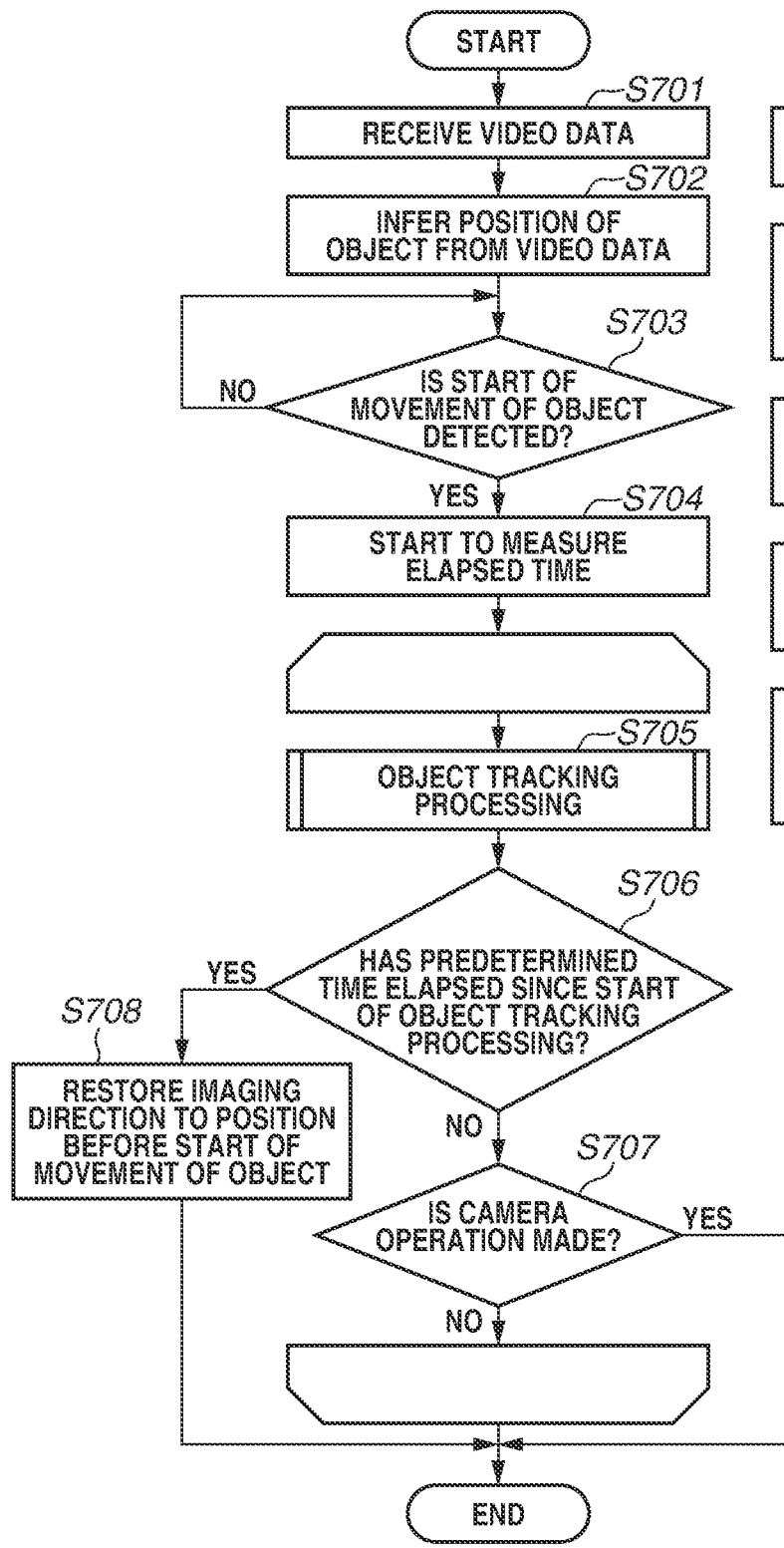

IMAGING SYSTEM, AND CONTROL APPARATUS AND IMAGING APPARATUS CONSTITUTING SAME

BACKGROUND

Technical Field

The present disclosure relates to an imaging system including an imaging apparatus, and more particularly to an imaging system capable of controlling a camera to track a detected object.

Description of the Related Art

For video production, a technique for capturing an image and making a production by controlling a camera from a remote place without going to the imaging location, called remote production, has been becoming widespread in recent years.

This technique enables the camera operator to capture a video image equivalent to that when the camera is controlled at the site, by remotely controlling the camera via a network using an apparatus, such as a controller. The technique also has the effect of reducing the travel costs to go to the site.

With the recent advancement of artificial intelligence (AI), techniques for detecting a desired object and controlling a camera to track the object have also been emerging in recent years.

Such techniques can be combined to implement a system with which the camera operator can control the pan and tilt of the camera from a remote place while the AI-driven camera can automatically track an object based on its own determination and inference.

Specific examples of the prior art include Japanese Patent Application Laid-Open No. 2005-86360, which discusses a technique including an automatic tracking mode where an object can be automatically tracked and a manual control mode where the camera operator can manually perform pan and tilt control. The modes can be switched by user operations.

Japanese Patent Application Laid-Open No. 2022-2378 discusses a technique including an automatic tracking mode and a manual control mode, by which the manual control mode automatically transitions to the automatic tracking mode if a detected object enters a predetermined range in the image.

As the distance between the controller operated by the camera operator and the camera increases, the latency (delay) of the network tends to increase. The latency also increases if there are a lot of relay devices interposed between the camera and the controller aside from the network latency.

A higher latency causes a greater delay with which control instructions given by the camera operator operating from a remote place arrive at the camera. This makes the operation of manually capturing the object difficult, degrading the operability.

Under the circumstances, the system discussed in Japanese Patent Application Laid-Open No. 2022-2378 can be used to capture an object within the imaging range through the follow-up intervention of the automatic tracking function even if the object is difficult to manually capture within the imaging range.

SUMMARY

In view of the above, users who want to control the angle of view in an elaborate manner, like a professional cameraman, would desire division of roles so that the automatic tracking function operates in a secondary manner while their own control plays a predominant role. The present disclosure is directed to providing a camera control apparatus that enables an automatic tracking function to operate in a secondary manner while a camera operator's manual control plays a predominant role.

According to an aspect of the present disclosure, a control apparatus includes an input unit to which receives an image, a first detection unit configured to detect an object from the received image, a second detection unit configured to detect a start of movement of the detected object, and a control unit configured to, in a case where the start of movement is detected, control an imaging range of an imaging apparatus based on a position of the detected object for a predetermined time, and stop controlling the imaging range based on the position of the detected object after a lapse of the predetermined time.

Further features of the present disclosure will become apparent from the following description of exemplary embodiments with reference to the attached drawings.

BRIEF DESCRIPTION OF THE DRAWINGS

FIG. 2 is a diagram illustrating a block configuration of apparatuses according to the first to third exemplary embodiments.

FIG. 3A is a flowchart illustrating operation procedures for a workstation according to the first exemplary embodiment and 3B is a flowchart illustrating operation procedures a camera according to the first exemplary embodiment.

FIG. 9A is a flowchart illustrating operation procedures for a workstation according to a third exemplary embodiment and FIG. 9B is a flowchart illustrating operation procedures for a controller according to a third exemplary embodiment.

DESCRIPTION OF THE EMBODIMENTS

Figure 1:
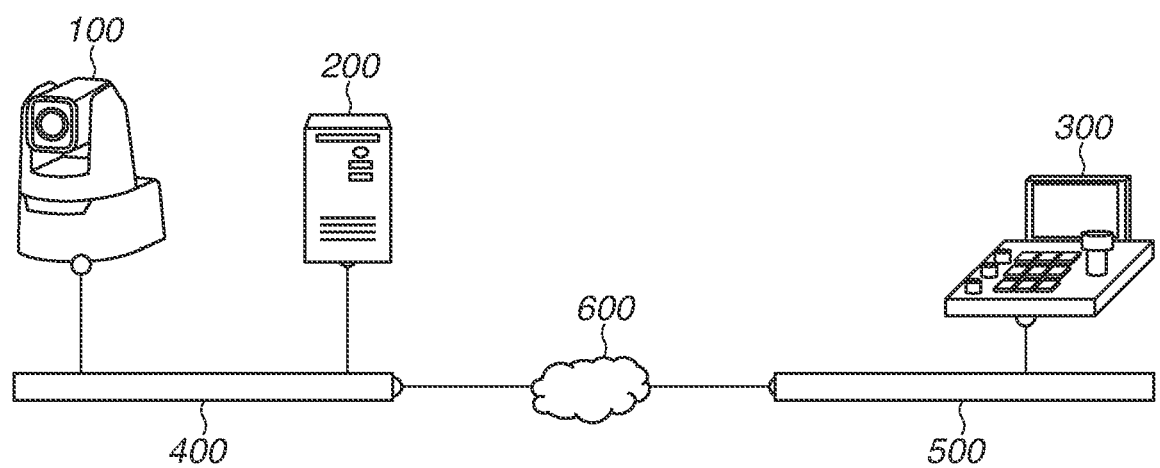
FIG. 1 is a diagram illustrating a configuration example of an entire imaging system according to first to third exemplary embodiments.

Exemplary embodiments of the present disclosure will be described in detail below with reference to the attached drawings. In the drawings, like numbers refer to like members. A redundant description thereof will be omitted.

An imaging system according to a first exemplary embodiment, including an imaging apparatus, a first control apparatus (hereinafter, also referred to as a workstation), and a second control apparatus (hereinafter, also referred to as a controller), and a control method thereof will be described. The first and second control apparatuses can control an imaging range of the imaging apparatus by respective different methods.

The present imaging system can be used for video production and still image capturing.

<Description of Imaging System>

FIG. 1 is a diagram illustrating an example of a configuration of the imaging system according to the present exemplary embodiment. In FIG. 1, in the imaging system, a camera 100 that is the imaging apparatus and a workstation 200 that is the first control apparatus are connected via a local area network (LAN) 400. A controller 300 that is the second control apparatus is connected to a LAN 500. The LANs 400 and 500 are connected via the Internet 600, and the apparatuses can communicate with each other. The camera 100 and the workstation 200 are installed at physically close positions. The controller 300 is installed in a remote place away from the camera 100 and the workstation 200. The communication between the controller 300 and the camera 100 and the communication between the controller 300 and the workstation 200 are therefore prone to latency compared with the communication between the camera 100 and the workstation 200.

Basic operations of the apparatuses will initially be described. The camera 100 includes an imaging unit, and distributes captured video data to other apparatuses via the networks and/or video cables. As employed in the present exemplary embodiment and this specification, frame-by-frame images constituting the video data may be referred to as captured images. The camera 100 further includes a driving unit 109 to be described below, and has a mechanism capable of pan and tilt operations for changing the imaging direction by the driving unit rotating the imaging unit.

The workstation 200 detects an object from the captured images distributed from the camera 100. The workstation 200 generates a control signal for object tracking, such as to change the imaging direction of the camera 100 based on the position of the detected object, and transmits the control signal to the camera 100 via the LAN 400. Instead of the workstation 200 being separate from the camera 100, the functions of the workstation 200 may be built in the camera 100 so that the camera 100 and the workstation 200 are integrally configured.

The controller 300 accesses the camera 100 via the Internet 600 to obtain the video data captured by the camera 100 and control the camera 100 based on user operations. As employed herein, the user who operates the controller 300 to manually control the imaging range of the camera 100 may be referred to as a camera operator.

In this imaging system, the user can change the imaging direction of the camera 100 to a desired direction by operating the controller 300 from the remote place while the workstation 200 controls the imaging direction of the camera 100 to automatically track the object based on the captured video image obtained from the camera 100. Such a configuration of the imaging system enables intervention of automatic tracking control by the workstation 200 during the user's manual control. This can satisfy the user's demand to control the camera 100 from the remote place with communication latency while reducing the effect of delay in the manual control due to the communication latency.

<Description of Apparatuses>

Next, configurations of the apparatuses constituting the imaging system will be described with reference to FIG. 2.

A configuration of the camera 100 will initially be described in detail. In the camera 100, a central processing unit (CPU) 101, a random access memory (RAM) 102, a read-only memory (ROM) 103, a video output interface (I/F) 104, a network I/F 105, an image processing unit 106, and a driving I/F 108 are connected to each other via an internal bus 110.

The CPU 101 generally controls the camera 100 by controlling the components of the camera 100.

The RAM 102 is a volatile high-speed storage device typified by a dynamic RAM (DRAM). An operating system (OS), various programs, and various types of data are loaded into the RAM 102. The RAM 102 is also used as a working area of the OS and various programs.

The ROM 103 is a nonvolatile storage device typified by a flash memory, a hard disk drive (HDD), a solid-state drive (SSD), and a Secure Digital (SD) card. The ROM 103 is used as a permanent storage area for the OS, various programs, and various types of data, and is also used as a storage area for various types of short-term data.

Details of the various programs stored in the RAM 102 and the ROM 103 of the camera 100 will be described.

The video output I/F 104 is an I/F for outputting a video image captured by an image sensor 107 to be described below to the outside. The video output I/F 104 is configured with the Serial Digital Interface (SDI) or the High-Definition Multimedia Interface (HDMI)®. In the imaging system according to the present exemplary embodiment, the video output I/F 104 is connected to a video input I/F 208 of the workstation 200 to be described below. However, the video output I/F 104 may output the video image via the network IF 105 and the LAN 400.

The network I/F 105 is an I/F for connecting to the foregoing LAN 400 and in charge of communication with external apparatuses, such as the workstation 200 and the controller 300, via a communication medium, such as the Ethernet®. Further, the camera 100 may be remotely controlled via other IFs, such as a not-illustrated serial communication I/F.

The image sensor 107 is connected to the image processing unit 106. The image processing unit 106 converts image data obtained from the image sensor 107 into a predetermined format, compresses the converted image data as appropriate, and transfers the resulting image data to the RAM 102. The image processing unit 106 may also perform zooming, focusing, and image quality adjustment, such as exposure control, based on the image data obtained from the image sensor 107, and/or perform cropping for cutting out only a predetermined area of the image data. Such operations are performed based on instructions given from external communication apparatuses, such as the workstation 200 and the controller 300, via the network IF 105.

Examples of the image sensor 107 include a charge-coupled device (CCD) and complementary metal-oxide-semiconductor (CMOS) image sensors. The image sensor 107 functions as the imaging unit of the camera 100. The image sensor 107 generates image data by photoelectrically converting an object image formed by a not-illustrated imaging optical system. The imaging optical system and the image sensor 107 may be referred to collectively as an imaging unit. The driving I/F 108 is a connection unit with the driving unit 109 to be described below. The driving I/F 108 is in charge of communication for transmitting and receiving control signals for delivering instructions received from the CPU 101 to the driving unit 109.

The driving unit 109 is a rotary mechanism for changing the imaging direction of the camera 100 (i.e., the imaging direction of the imaging unit), and includes a mechanical driving system and motors serving as driving sources. In the present exemplary embodiment, the driving unit 109 changes the imaging direction by rotating the image sensor and lenses included in the imaging optical system integrally. The driving unit 109 performs rotary driving, such as pan and tilt operations, for changing the imaging direction with respect to horizontal and vertical directions based on instructions received from the CPU 101 via the driving I/F 108. If the imaging optical system includes a magnification lens (also referred to as a zoom lens), the driving unit 109 performs a zoom operation for optically changing the imaging angle of view by moving the zoom lens in the optical axis direction.

Next, the workstation 200 will be described. In the workstation 200, a CPU 201, a RAM 202, a ROM 203, a network IF 204, a video output IF 205, a user input IF 206, an inference unit 207, and the video input IF 208 are connected to each other via an internal bus 209.

The CPU 201 generally controls the workstation 200 by controlling the components of the workstation 200.

The RAM 202 is a volatile high-speed storage device typified by a DRAM. An OS, various programs, and various types of data are loaded into the RAM 202. The RAM 202 is also used as a working area of the OS and various programs.

The ROM 203 is a nonvolatile storage device typified by a flash memory, an HDD, an SSD, and an SD card. The ROM 203 is used as a permanent storage area for the OS, various programs, and various types of data, and also used as a storage area for various types of short-term data.

Details of the various types of programs stored in the RAM 202 and the ROM 203 of the workstation 200 will be described below.

The network I/F 204 is an I/F for connecting to the foregoing LAN 400. The network I/F 204 functions as a communication unit in charge of communication with external apparatuses, such as the camera 100 and the controller 300, via a communication medium, such as the Ethernet®.

The video output I/F 205 is an I/F for outputting a setting information screen of the workstation 200 to a display (not illustrated) connected to the workstation 200. Since the workstation 200 can generate control instructions for the camera 100 based on the captured images received, the workstation 200 does not necessarily need to display the captured images to the user.

The user input I/F 206 is an I/F for connecting to input devices for user operation, such as a mouse, a keyboard, and a touchscreen. The user input I/F 206 is configured as a Universal Serial Bus (USB) IF, for example. The video output IF 205 and the user input I/F 206 constitute a user I/F between the user and the workstation 200.

The inference unit 207 estimates the position of a predetermined object and the presence or absence of the object based on a video image received from the camera 100 via the video input I/F 208 to be described below. The inference unit 207 includes a calculation unit specialized in image processing or inference processing, such as a graphics processing unit (GPU). While a GPU is typically effectively used for training processing and inference processing using a trained model generated by training processing, similar functions may be implemented using a reconfigurable logic circuit, such as a field-programmable gate array (FPGA). The processing at the inference unit 207 may be implemented by the CPU 201. A plurality of types of calculation units or circuits may be combined, like a GPU, an FPGA, and a CPU. While in the present exemplary embodiment, the inference unit 207 capable of inference processing is used, the inference processing is not essential as long as the inference unit 207 can function as a detection unit that performs object detection based on the video image received from the camera 100. The inference unit 207 is desirably configured to be capable of predicting the future moving direction and speed based on the type of object and past movement information about the object, which leads the tracking operation to be more accurately controlled as compared with a configuration where the object detection is performed without inference processing. If the object position is only detected, the position of the object on the image is controlled to be restored after the object on the image is moved. By contrast, the inference allows pan and tilt operations simultaneously with the movement of the object. Information indicating the position of the predetermined object estimated by the inference unit 207 is transmitted via the internal bus 209 to the CPU 201.

The video input I/F 208 is an I/F for receiving the video image from the camera 100, and functions as an input unit to which an image is input. The video input I/F 208 is configured with the SDI or HDMI.

Next, the controller 300 will be described. In the controller 300, a CPU 301, a RAM 302, a ROM 303, a network I/F 304, a display unit 305, and a user input I/F 306 are connected to each other via an internal bus 307.

The CPU 301 generally controls the controller 300 by controlling the components of the controller 300.

The RAM 302 is a volatile high-speed storage device typified by a DRAM. An OS, various programs, and various types of data are loaded into the RAM 302. The RAM 302 is also used as a working area of the OS and various programs.

The ROM 303 is a nonvolatile storage device typified by a flash memory, an HDD, an SSD, and an SD card. The ROM 303 is used as a permanent storage area for the OS, various programs, and various types of data, and also used as a storage area for various types of short-term data.

Details of the various programs stored in the RAM 302 and the ROM 303 of the controller 300 will be described below.

The network I/F 304 is an I/F for connecting to the foregoing LAN 500. The network OF 304 functions as a communication unit in charge of communication with external apparatuses, such as the camera 100 and the workstation 200, via a communication medium, such as the Ethernet®. Examples of the communication include transmission and reception of control commands to/from the camera 100 and the workstation 200, and reception of the video image from the camera 100.

The display unit 305 displays the video image captured by the camera 100 and a setting screen of the controller 300. For example, the display unit 305 includes a liquid crystal panel or an organic electroluminescence (EL) panel.

While the controller 300 including the display unit 305 is described herein, such a configuration is not restrictive. For example, the controller 300 and a display monitor dedicated to displaying the captured video image may be separate from each other.

The user input I/F 306 is an OF that functions as an operation receiving unit for receiving the user's operations on the controller 300. Examples of operation members for the user to operate may include a button, a dial, a joystick, and a touchscreen. The user input OF 306 receives input for controlling the pan and tilt of the camera 100 based on user operations, for example. Information indicating an operation received by the user input OF 306 is transmitted to the CPU 301 via the internal bus 307.

The above is a description of the components of the apparatuses.

<Description of Basic Operations for Automatic Tracking Operation and Manual Control Operation>

Basic operations in the present imaging system, or an operation of controlling the camera 100 to track an object detected by the workstation 200 and an operation of controlling the camera 100 based on user operations received by the controller 300, will be described. The operation of controlling the camera 100 to track the object detected by the workstation 200 will be referred to as an automatic tracking operation. The operation of controlling the camera 100 based on user operations received by the controller 300 will be referred to as a manual control operation.

The automatic tracking operation by the workstation 200 will initially be described with reference to FIGS. 3A and 3B.

FIG. 3A illustrates an operation procedure for the workstation 200. FIG. 3B illustrates an operation procedure for the camera 100. FIGS. 3A and 3B illustrate a series of processes in which the workstation 200 controls the camera 100 based on object positions detected from captured images.

The operation of the workstation 200 will be described with reference to FIG. 3A. FIG. 3A illustrates loop processing for the workstation 200 to receive captured video images successively transmitted from the camera 100 via the video input I/F 208, identify the position of an object from the captured images constituting the video data, and control tracking of the object. This procedure is started by the CPU 201 of the workstation 200 receiving a command to perform the automatic tracking operation via the network IF 204 or the user input I/F 206.

In step S101, the CPU 201 of the workstation 200 receives the video data captured by the camera 100 via the video input I/F 208. The CPU 201 controls the video input I/F 208 to successively write the received video data to the RAM 202 inside.

The video data is sequentially output from the video output IF 104 of the camera 100 at a predetermined frame rate.

The video data may be received via the network I/F 204 and loaded into the RAM 202 inside.

In step S102, the CPU 201 reads the captured video data from the RAM 202 and inputs the video data into the inference unit 207. The inference unit 207 infers the type of object and the position of the object in each frame of the video data, and writes the inference result to the RAM 202. The CPU 201 reads the information written to the RAM 202 by the inference unit 207 and thereby obtains object information about the current frame. The inference unit 207 includes a trained model generated by using a machine learning technique, such as deep learning. The inference unit 207 receives an image corresponding to each frame of the captured video data as input data, and outputs the type of tracking target, such as a human figure, position information about the tracking target, and a score indicating the likelihood of the tracking target as output data. In the present exemplary embodiment, the position information will be described that is coordinates indicating the barycentric position of the target in the image.

In step S103, the CPU 201 determines whether the position information about the object included in the result of the inference made by the inference unit 207, read in step S102, matches the position information about the object included in the result of inference of the previous frame (hereinafter, referred to as the previous inference result).

The CPU 201 thereby determines whether the object position in the captured video image has moved between the previous frame and the current frame, i.e., whether to perform pan and tilt driving. If the CPU 201 determines that the position information about the object included in the result of inference of the current frame and the position information about the object included in the previous inference result are the same (YES in step S103), the CPU 201 determines that a start of movement of the object is not detected, and the processing skips steps S104 to S107. On the other hand, if the CPU 201 determines that the position information about the object included in the result of inference of the current frame and the position information about the object included in the previous inference result are not the same (NO in step S103), the processing proceeds to step S104.

In step S104, the CPU 201 calculates the difference between the position information about the object obtained from the inference unit 207 in step S102 and the position information about the object included in the previous inference result, and calculates driving angular velocities in the pan and tilt directions based on the difference to track the object.

In step S105, the CPU 201 converts the calculations of step S104 into a first control command according to a protocol predetermined as a method for controlling the camera 100, and writes the first control command to the RAM 202.

In step S106, the CPU 201 reads the first control command converted and written to the RAM 202 in step S105, and transmits the first control command to the camera 100 via the network I/F 204. The CPU 201 thereby functions as a control unit for controlling the imaging range of the camera 100.

In step S107, the CPU 201 writes the position information about the object read from the inference unit 207 in step S102 to the RAM 202 to use as the position information about the previous inference result next time. The processing returns to the beginning of the loop processing.

While the pan and tilt driving of the camera 100 is controlled based on the information calculated in step S104, a dead zone may be provided not to perform camera control if the difference is within a predetermined range, for example. Such a mechanism can prevent the pan and tilt driving control of the camera 100 from being hypersensitive.

Next, the operation procedure for the camera 100 in receiving the first control command from the workstation 200 will be described with reference to FIG. 3B. This procedure is started by the CPU 101 detecting the arrival of the first control command at the network I/F 105.

In step S201, the CPU 101 initially receives the first control command via the network IF 105, and causes the network IF 105 to write the first control command to the RAM 102.

In step S202, notified by the network I/F 105 of the reception of the first control command, the CPU 101 reads values indicating the driving directions and driving speeds (vector quantities) in the respective pan and tilt directions from the first control command written to the RAM 102 by the network I/F 105. The value of the driving direction in the pan direction is a value indicating right or left. The value of the driving direction in the tilt direction is a value indicating up or down. The driving speeds may have plus and minus directions so that the values indicating the driving speeds include information about the driving directions.

In step S203, the CPU 101 derives driving parameters for the pan and tilt driving in desired directions at desired speeds based on the values read in step S202. The driving parameters are parameters for controlling respective motors (not illustrated) in the pan and tilt directions, included in the driving unit 109. For example, the driving parameters may be derived by converting the driving speeds included in the received first control command with reference to a conversion table stored in the ROM 103 in advance.

In step S204, the CPU 101 controls the driving unit 109 via the driving I/F 108 based on the driving parameters derived in step S203. The driving unit 109 rotates based on the driving parameters, whereby the imaging direction of the camera 100 is changed, i.e., pan and tilt operations are performed.

Next, the manual control operation where the camera 100 is controlled based on the user's operation on the controller 300 will be described with reference to FIG. 4. In the manual control operation, the camera 100 is controlled based on a second control command (to be described in detail below) transmitted from the controller 300. Since the operation of the camera 100 is similar to that of FIG. 3B, a description thereof will be omitted. With the first control command in the foregoing description of steps S201 to S204 replaced with the second control command, the operation procedure can be applied to that of the camera 100 in the manual control operation.

The procedure of the manual control operation by the controller 300 illustrated in FIG. 4 will be described. This control procedure is started by the CPU 301 detecting the user's operation made on the user input IF 306. In manual control, pan and tilt are controlled based on the user's operation, and thus object tracking is not necessarily performed. In the present exemplary embodiment, it will be described that user operations are made using a joystick. However, other operation members may be used.

In step S301, the CPU 301 of the controller 300 detects the user's joystick operation via the user input IF 306.

In step S302, the CPU 301 obtains the directions and amounts of operation of the joystick from the user input IF 306. A specific example of the joystick is an analog output joystick using voltages output from variable resistors provided for the respective pan and tilt directions.

The CPU 301 can determine the angular velocities in the respective pan and tilt directions by reading digital values obtained from the voltages input by the joystick via analog-to-digital (A/D) conversion units (not illustrated). Values in a predetermined range, such as 0 to 1023, can be read from the A/D conversion units as values corresponding to the angular velocity components in the respective pan and tilt directions based on the amounts of operation.

In step S303, the CPU 301 converts the directions and amounts of operation of the joystick obtained in step S302 into a control command indicating the driving directions and driving speeds of the pan and tilt driving. The CPU 301 performs this conversion by converting the directions and amounts of operation of the angular velocities into a control command according to the protocol predetermined as the method for controlling the camera 100. The CPU 301 writes the converted control command to the RAM 102.

In step S304, the CPU 301 reads the control command converted and written to the RAM 102 in step S303, and transmits the control command to the camera 100 via the network IF 105 as a second control command.

The operation procedures for the controller 300 and the camera 100 thus enable the rotary operation (manual control operation) of the camera 100 based on user operations.

<Description of Assist Function>

In the foregoing methods of the automatic tracking operation and the manual control operation, the workstation 200 and the controller 300 each singly control the imaging processing (pan and tilt operations) of the camera 100. The workstation 200 according to the present exemplary embodiment has an assist function of performing the automatic tracking operation for a predetermined time after the detection of a start of movement of the object even during the manual control operation. This reduces a drop in operability in manually tracking the object in the presence of communication latency between the controller 300 and the camera 100. In another configuration, the user may set whether to perform the manual control operation in an assist mode where the assist function is enabled (assist mode on or off) using a selection unit, so that an assist operation to be described below is performed only when the assist mode is set to on.

In yet another configuration, the user may select a specific object. When the selection is made, the assist function may be turned on to perform the assist operation on the object. In such configurations, either the workstation 200 or the controller 300 singly performs the operation of controlling the pan and tilt operations of the camera 100 if the assist mode is off.

Figure 5:
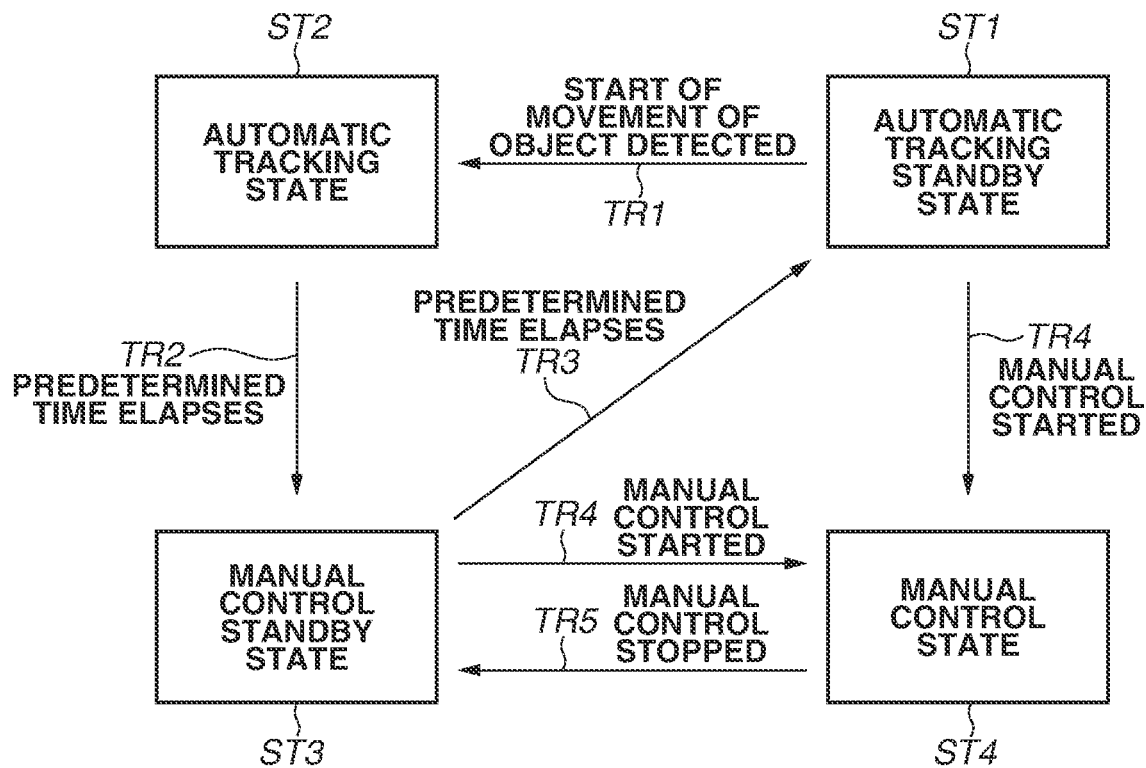
FIG. 5 is a diagram illustrating state transitions of the workstation according to the first exemplary embodiment.

State transitions of the imaging system according to the present exemplary embodiment will initially be described. FIG. 5 is a diagram illustrating states of the imaging system and transition conditions. The imaging system transitions between four states, namely, automatic tracking standby state ST1, automatic tracking state ST2, manual control standby state ST3, and manual control state ST4, based on transition conditions TR1 to TR5.

In the automatic tracking standby state ST1, the imaging system detects a start of movement of the object in the captured images input from the camera 100. If a start of movement of the object is detected (TR1), the imaging system transitions to the automatic tracking state ST2 and enters a state of automatically tracking the object. The automatic tracking standby state ST1 is a standby state where the imaging system detects the presence or absence of a start of movement of the object based on the captured images obtained frame by frame and can immediately transition to the automatic tracking state ST2 upon detection of the start of movement. The start of movement refers to a situation where a movement of the object is detected between the previously input captured image (frame n−1) and the currently input captured image (frame n) while no movement of the object is detected between the captured image input the time before last (frame n−2) and the previously input captured image. In the present exemplary embodiment, the start of movement of the object is detected by the workstation 200. However, the start of movement may be detected by any apparatus in the imaging system. For example, the camera 100 may detect the start of movement.

In the automatic tracking state ST2, the workstation 200 performs the automatic tracking operation described with reference to FIG. 3A. If the start of movement is detected by an apparatus other than the workstation 200, information indicating the detection of the start of movement is transmitted to the workstation 200, and the workstation 200 starts the automatic tracking operation. If a predetermined time elapses (TR2) in the automatic tracking state ST2, the imaging system transitions to the manual control standby state ST3, where the camera 100 waits for an operation on the controller 300. In the manual control standby state ST3, the workstation 200 does not need to generate or transmit the first control command, and may even stop detecting the object or a start of movement of the object. Alternatively, the camera 100 may be configured not to use the first control command even if the workstation 200 transmits the first control command to the camera 100.

If a predetermined time elapses without a manual control (TR3) after the transition to the manual control standby state ST3, the imaging system transitions to the automatic tracking standby state ST1. On the other hand, if the controller 300 starts to accept a manual control (TR4) in the manual control standby state ST3, the imaging system transitions to the manual control state ST4 and performs the foregoing manual control operation. If the manual control operation is stopped (TR5) in the manual control state ST4, the imaging system transitions to the manual control standby state ST3 again.

If the user's operation on the controller 300 is detected (TR4) before the detection of a start of movement of the object in the automatic tracking standby state ST1, the imaging system transitions to the manual control state ST4.

With the assist function, if the predetermined time elapses (TR2) in the automatic tracking state ST2 in the foregoing state transitions, the imaging system transitions to the manual control standby state ST3, so that the workstation 200 operates in a secondary manner while the manual control by the camera operator plays a predominant role. The operation procedure for the workstation 200 in the assist mode will be described in detail with reference to FIG. 6.

Figure 6:
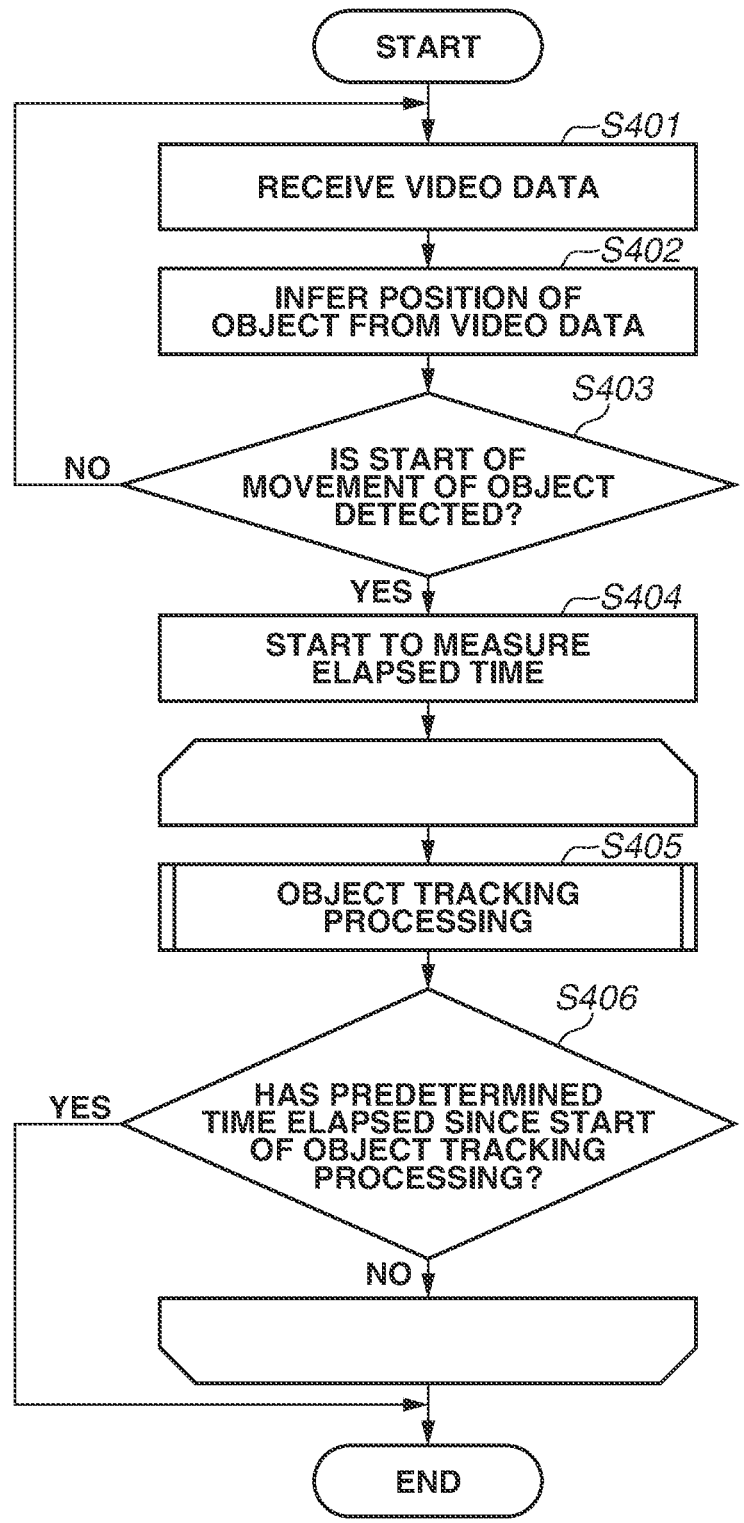
FIG. 6 is a flowchart illustrating an operation procedure for the workstation according to the first exemplary embodiment.

The operation procedure of FIG. 6 is different from that of FIG. 3A in that the automatic tracking processing is only performed for a predetermined period of time after the detection of a start of movement of the object. This procedure is started by the CPU 201 of the workstation 200 receiving a command to perform the assist mode via the network I/F 204 or the user input I/F 206. At the beginning of this procedure, the imaging system is in the automatic tracking standby state ST1.

Step S401 corresponds to step S101. In step S401, the CPU 201 of the workstation 200 controls the video input I/F 208 to receive video data captured by the camera 100 and successively write the received video data to the RAM 202 inside.

Step S402 corresponding to step S102. In step S402, the CPU 201 causes the inference unit 207 to estimate the type of object and the position of the object in the currently received frame, and obtains object information about the current frame.

Step S403 corresponds to step S103. In step S403, the CPU 201 functions as a detection unit for detecting a start of movement of the object by reading the position information about the object estimated by the inference unit 207 and comparing the position information with the position information included in the previous inference result. If the current position information and the previous position information are the same (NO in step S403), the processing returns to step S401. The processing of steps S401 to S403 is repeated in synchronization with the frame rate until the current position information and the previous position information become different. In other words, in steps S401 to S403, the video input I/F 208 periodically receives the captured video image from the camera 100, the inference unit 207 successively updates and stores inference results based on the received video image, and the CPU 201 periodically determines the movement of the object based on the inference results of the inference unit 207. If the current position information and the previous position information are not the same and a movement is detected (YES in step S403), the processing proceeds to step S404. The processing in step S403 is thus performed twice or more if the previous position information and the previous but one position information are the same. That a movement of the object is detected in step S403 therefore means that a start of movement of the object is detected.

In step S404, the CPU 201 reads time information from a not-illustrated timer, and writes the time information to the RAM 202, thereby starting to measure elapsed time from the detection of the start of movement.

The processing then proceeds to step S405 corresponding to object tracking processing. The object tracking processing performed in step S405 is processing corresponding to steps S101 to S107 of FIG. 3A, where the CPU 201 controls the camera 100 based on the difference between the position of the object detected at the previous inference and that of the object detected at the current inference. This processing is repeated until a predetermined time elapses. Since step S103 in the first round of the object tracking processing is a repetition of the same processing as that of step S403, step S103 is desirably omitted in the first round of the object tracking processing.

After the series of processes corresponding to steps S101 to S107 is performed by the CPU 201, the processing proceeds to step S406. In step S406, the CPU 201 measures the elapsed time by reading the time information from the timer again and calculating a difference from the time information written to the RAM 202 in step S404. The CPU 201 then determines whether a predetermined time has elapsed since the start of the object tracking processing by comparing the elapsed time with the predetermined time. The predetermined time may be stored in the ROM 203 in advance as a fixed value. The user's time setting operation may be received via the user input I/F 206, and the CPU 201 may determine the predetermined time based on the accepted time. The user input I/F 206 here functions as a time setting receiving unit. The time setting method is not limited in particular. For example, a specific time setting like x seconds may be received. The user may select a time setting from several levels such as "short", "intermediate", and "long".

As another example of the determination of the predetermined time used for the determination in step S406, a configuration will be described where a communication time (communication delay time), or time taken to perform communication between the camera 100 and the controller 300, is used as the predetermined time. The communication time between the camera 100 and the controller 300 is approximately the same as the communication time between the workstation 200, which is connected to the camera 100 via the LAN 400 and located near the camera 100, and the controller 300. A method will now be described for measuring and obtaining a communication time that is the time taken to make the communication between the camera 100 or the workstation 200 and the controller 300 and using the measured communication time as the predetermined time.

The workstation 200 can measure a communication time between the apparatuses by transmitting a packet to the controller 300 via the network IF 204 and measuring the time until responded.

Figure 7:
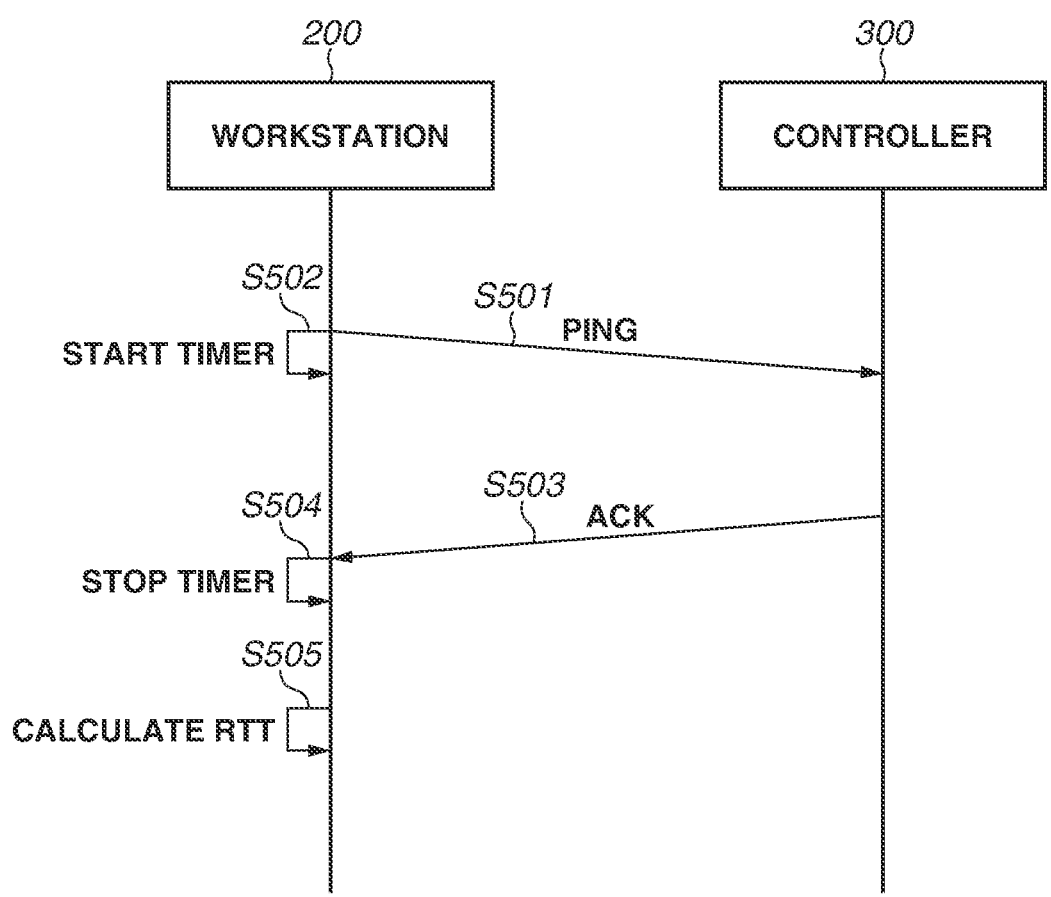
FIG. 7 is a diagram illustrating a sequence in measuring a communication delay time according to the first exemplary embodiment.

FIG. 7 is a diagram illustrating a sequence in measuring the communication time between the workstation 200 and the controller 300.

In step S501, the CPU 201 of the workstation 200 transmits a Packet Internet Groper (PING) to the controller 300 via the network I/F 204. In step S502, the CPU 201 starts the internal timer.

The CPU 301 of the controller 300 receives the PING, and transmits an acknowledgement (ACK) indicating the reception of the PING to the workstation 200 via the network IF 304.

In step S503, the network IF 204 receives the ACK transmitted from the controller 300. In step S504, the CPU 201 stops the timer. In step S505, the CPU 201 calculates a round-trip time (RTT) equivalent to the amount of time taken to make the reciprocal communication based on the time of the timer at that time, and stores the RTT into the RAM 202 as the communication time.

The communication time may be measured at timing when the workstation 200 and the controller 300 are connected, or may be regularly measured and updated. The communication time measured in such a manner may be stored in advance and used as the predetermined time in the determination processing of step S406.

The method for measuring the communication time between the workstation 200 and the controller 300 is not limited thereto. In measuring the communication delay time, the workstation 200 can use methods other than making such an inquiry to the controller 300.

The CPU 201 of the workstation 200 can obtain the communication time by methods other than the method for measuring the communication time.

For example, if either the camera 100 or the controller 300 stores the communication time taken to make the communication between the camera 100 and the controller 300, the CPU 201 may receive the communication time from the camera 100 or the controller 300 and use the communication time as the predetermined time. Alternatively, the CPU 201 may instruct either the camera 100 or the controller 300 to measure the communication time taken to make the communication between the camera 100 and the controller 300. For example, the CPU 201 may instruct the camera 100 to transmit a packet to the controller 300 via the network IF 105 and measure the time until responded, and obtain the result as the communication time taken to make the communication between the camera 100 and the controller 300.

If a monitor (not illustrated) for observing the video image of the camera 100 is used aside from the controller 300, the workstation 200 may measure the communication time with the controller 300 by measuring communication time with the monitor. In other words, the workstation 200 may measure communication time between a device installed near the controller 300 and a device installed near the camera 100 and use the measured communication time as the communication delay time between the camera 100 and the controller 300, as long as the Internet 600 that is the main cause of the communication delay is interposed in common.

For example, the device on the controller 300 side may be any device located on the LAN 500 or in the office common to the controller 300. Similarly, the device on the camera 100 side may be any device located on the LAN 400 or in the office to the camera 100, like the workstation 200. The RTT determined as described above corresponds to the reciprocal communication delay time of the communication via the Internet 600.

More specifically, the RTT corresponds to the sum of the outbound communication delay time taken to deliver the video image from the camera 100 to the controller 300 and the inbound communication delay time taken to deliver control information based on the operation of the controller 300 from the controller 300 to the camera 100. If the RTT determined as described above is used as the predetermined time in step S406, the predetermined time is therefore likely to be substantially the same as the time from when the camera operator visually observes a start of movement of the object and then operates the controller 300 to when a control command based on the operation reaches the camera 100. The use of the communication delay time as the predetermined time for which the automatic tracking operation of the object is stopped in the assist mode can thus be said to be appropriate.

A value obtained by adding a predetermined value to the RTT may be used as the predetermined time, taking into consideration a delay time for the user (camera operator) to observe the video image and input an operation (time taken to make the user's reaction). The predetermined value to be added to the RTT may also be changed by the user's time setting operation.

Alternatively, the predetermined time may be determined stepwise based on the communication delay time (RTT) measured or obtained in communication. For example, the predetermined time may be a first time if the communication delay time is greater than or equal to a first threshold. The predetermined time may be a second time shorter than the first time if the communication delay time is less than the first threshold and greater than or equal to a second threshold. The predetermined time may be a third time even shorter than the second time if the communication delay time is less than the second threshold.

As described above, in the present exemplary embodiment, the CPU 201 determines, in the assist mode, whether the predetermined time has elapsed since the detection of a start of movement of the object in step S406. The CPU 201 continues the object tracking processing until the predetermined time elapses, and stops the object tracking processing after the lapse of the predetermined time. In other words, if a start of movement of the object is detected, the CPU 201 controls the imaging range for the predetermined time based on the detected object position.

Since the workstation 200 thus detects a start of movement of the object from captured video images and stops the object tracking processing after the lapse of the predetermined time, the automatic tracking function can operate in a secondary manner at appropriate timing while the camera operator's manual control plays a predominant role.

Suppose that the automatic tracking function makes an excessive follow-up operation, and an object the camera operator does not intend to follow is tracked, for example. In the presence of a latency, the timing to notice the tracking can be late and the angle of view can be controlled against the camera operator's intention.

According to the present exemplary embodiment, occurrences of such situations can be reduced.

A second exemplary embodiment will be described. In the first exemplary embodiment, the example has been described in which the object tracking operation is started by detecting a start of movement of an object and then stopped after a lapse of a predetermined time, and in particular, a communication delay time measured in advance is used as the predetermined time.

In the second exemplary embodiment, an example will be described of determining the predetermined time by taking into consideration an internal processing time inside a camera 100 in addition to the measured communication delay time.

While a difference from the first exemplary embodiment lies in the predetermined time used in step S406 of FIG. 6, the second exemplary embodiment is similar to the first exemplary embodiment in the system configuration, the configurations of the apparatuses, and the procedure performed in the assist mode (steps S401 to S406). A description thereof will thus be omitted.

Figure 8:
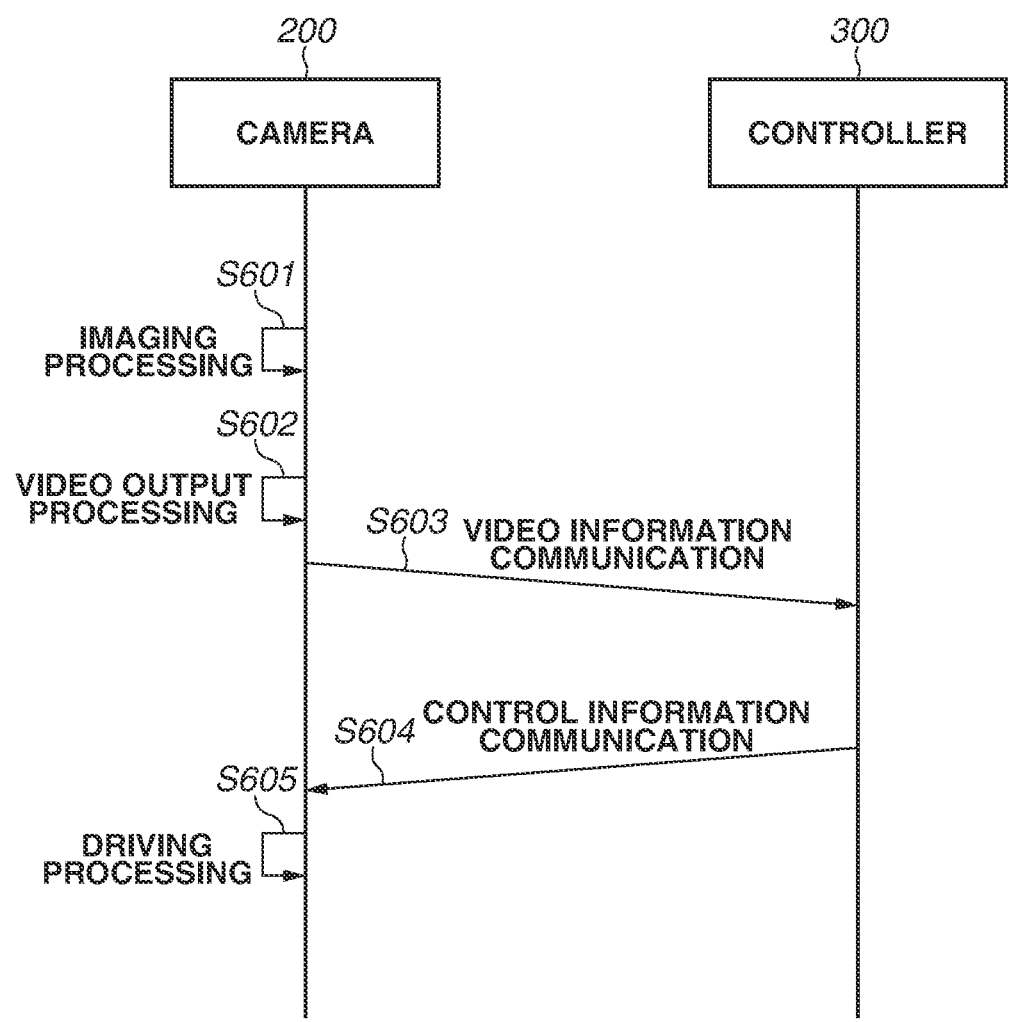
FIG. 8 is a diagram illustrating a sequence from imaging processing to driving processing according to a second exemplary embodiment.

FIG. 8 is a diagram illustrating a sequence from when the camera 100 captures an image of an object to when the driving unit 109 is controlled based on the camera operator's pan and tilt instructions (second control command).

A latency due to the network communication, referred to as the communication delay time (RTT) in the first exemplary embodiment, is the time taken to make communications in steps S603 and S604 of FIG. 8. The rest of the processing corresponds to the internal processing of the camera 100. Specifically, the internal processing includes imaging processing (step S601), video output processing (step S602), and driving processing (step S605). The processing in steps S601 to S605 is performed based on the operation procedure illustrated in FIG. 8.

The camera operator visually observes a video image captured by the camera 100 on the display unit 305 of the controller 300, and operates the controller 300. As a result, the second control command is transmitted to the camera 100 via the network, and finally the camera 100 starts to rotate and the imaging range changes.

In other words, the time from the start of step S601 to the end of step S605 illustrated here is the delay time with the time taken to complete the camera's internal processing (internal processing time) taken into account. Even if this total time is used as the predetermined time in step S406, the predetermined time is likely to be substantially the same as the time from when the camera operator visually observes the start of movement of the object and then inputs an operation to when the imaging unit of the camera 100 is rotated based on the second control signal based on the operation. The use of the total time as the predetermined time for which the automatic tracking operation of the object is stopped in the assist mode can thus be said to be appropriate.

The processing time of the camera 100 in steps S601, S602, and S605 is substantially uniquely determined by the performance and employed logic of the camera 100, and internal operation states, such as imaging frame rate and video output frame rate settings. The camera 100 stores such information inside in advance. The workstation 200 can obtain the information in advance when connecting to the camera 100, and use the information in determining the predetermined time used in step S406.

While the method in which the workstation 200 obtains the processing time of the camera 100 in steps S601, S602, and S605 has been described, such a method is not restrictive. For example, the camera operator may input any given time via the user input I/F of the workstation 200 or the controller 300. The time from when the workstation 200 detects a start of movement to when the user's joystick operation reaches the camera 100 or the workstation 200 may be measured as the predetermined time, taking into consideration the time taken to complete the internal processing. Like the first exemplary embodiment, the predetermined time may be obtained by adding a predetermined value or a time set by the user's time setting operation, taking into consideration the delay time until the user inputs the operation. Alternatively, the workstation 200 may similarly obtain an internal delay time from the detection of an operation by the user input IF 306 of the controller 300 to the transmission by the network IF 304.

According to the present exemplary embodiment, in addition to the delay time due to communication, times that can be delay factors specific to the constructed system can be more flexibly accommodated.

As describe above, the object tracking processing is stopped after a lapse of the time that takes into account the time taken to complete the internal processing from the imaging by the camera 100 to the start of rotation. This enables the automatic tracking function to operate in a secondary manner while the camera operator's manual control plays a predominant role.

A third exemplary embodiment will be described. In the first and second exemplary embodiments, the configuration in which the automatic tracking operation is performed by continuing the object tracking processing (step S405) until a predetermined time elapses from the detection of a start of movement of the object.

In the third exemplary embodiment, a configuration will be described where a workstation 200 stops the automatic tracking operation if the camera operator makes a camera operation before the predetermined time elapses from the detection of a start of movement of the object.

In the present exemplary embodiment, the workstation 200 performs an operation procedure illustrated in FIG. 9A instead of the operation procedure of FIG. 6 according to the first exemplary embodiment. The system configuration, the configurations of the apparatuses, and processing other than in the assist mode are similar to in the first exemplary embodiment. A description thereof will thus be omitted.

The processing in steps S701 to S706 in FIG. 9A is similar to that in steps S401 to S406 in FIG. 6. A detailed description thereof will thus be omitted. In the present exemplary embodiment, in step S706, the CPU 201 of the workstation 200 determines whether a predetermined time has elapsed since the start of the object tracking processing. If it is determined that the predetermined time has not elapsed (NO in step S706), the processing proceeds to step S707. In step S707, the CPU 201 determines whether a camera operation is made.

If the user's operation to change the imaging range of the camera 100 is input to the controller 300 via an operation member, such as a joystick, the controller 300 generates a second control command and transmits the second control command to the camera 100. At the same time, the controller 300 transmits information indicating the transmission of the second control command to the workstation 200. The CPU 201 of the workstation 200 determines whether the information indicating the transmission of the second control command by the controller 300 in response to the camera operation is received by the network I/F 204, and thereby functions as a detection unit for detecting the user's camera operation.

While the foregoing information is received from the controller 300, the method for determining the presence or absence of a camera operation is not limited thereto. The controller 300 may transmit information indicating the receipt of the user's camera operation to the workstation 200 instead of transmitting the information indicating the transmission of the second control command to the camera 100 to the workstation 200. As another example, the workstation 200 may inquire of the camera 100 whether the second control command is received from the controller 300.

In step S707, if the CPU 201 determines that a camera operation is made (YES in step S707), the processing exits the loop for continuing the object tracking processing for a predetermined time, illustrated in steps S705 and S706. The operation procedure then ends to hand over the control of the imaging range to the camera operator.

While the workstation 200 stops the processing procedure for tracking the object here, the camera 100 does not need to immediately stop performing the pan and tilt operations.

The camera 100 may continue to operate based on the object tracking processing of step S705 performed immediately before the stop while handing over control to the camera operator.

A specific example of the method for controlling the camera 100 in step S707 is to give the camera 100 rotation instructions by specifying the pan and tilt directions and speeds. If the rotation instructions are given by such a method, the camera 100 can continue to rotate in the pan and tilt directions and at the pan and tilt speeds received immediately before until next instructions are received. The workstation 200 hands over the camera control to the camera operator while deliberately leaving the operation continued instead of controlling the operation to stop. This enables continuous imaging operations without stopping the rotating operation, which can be said to be a favorable camerawork. In such a configuration where driving is continued based on the first control command until the second control command based on the user's operation arrives, the control using the second control command takes over after a while from the predetermined time used in step S706. Even with such a configuration, the control based on the object position (based on the first control command) can thus be said to be stopped after the lapse of the predetermined time without a user operation.

Return to step S706. If the CPU 201 determines here that the predetermined time has elapsed since the start of the object tracking processing (YES in step S706), the processing proceeds to step S708. If the predetermined time has elapsed without the user's operation input, the camera operator is considered to not have the intention to track the object that has been tracked by the workstation 200 for the predetermined time. In step S708, the CPU 201 therefore transmits a first control command to the camera 100 via the network I/F 204 to restore the imaging direction to a position before the start of movement of the object. This first control command is intended to give instructions for pan and tilt driving in the directions of reducing the difference from the imaging direction before the start of movement.

The processing for restoring the imaging direction can be implemented by the CPU 201 writing the imaging direction of the camera 100 to the RAM 202 in advance before detecting the movement of the object in step S703, and controlling the camera 100 based on the information in step S708.

To ease the action of abruptly changing the imaging direction of the camera 100, the moving speed to be specified in restoring the imaging direction may be lower than normal speeds, such as the speed in tracking an object and the speed when the camera 100 is operated by the camera operator.

Next, an operation procedure for the controller 300 will be described with reference to FIG. 9B.

Figure 4:
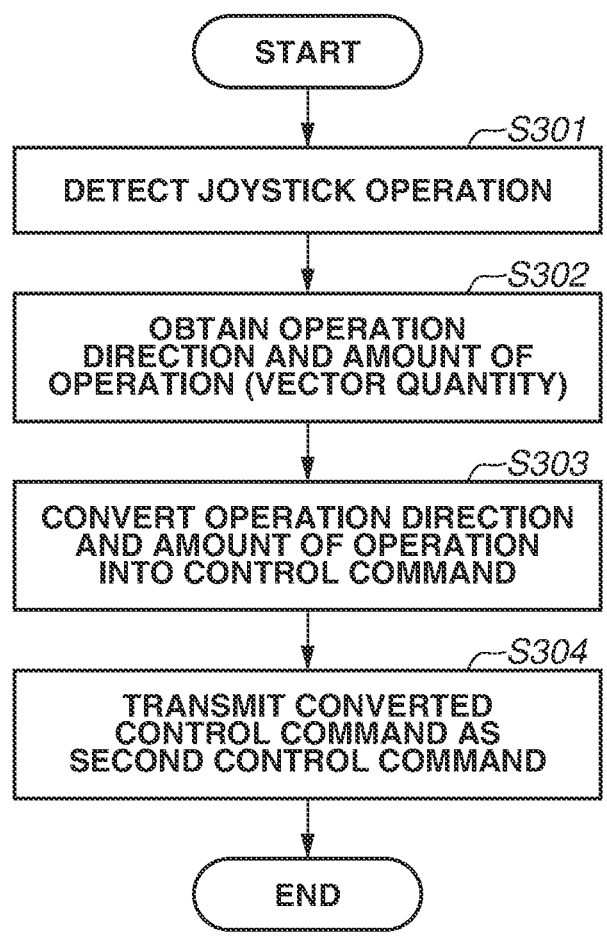
FIG. 4 is a flowchart illustrating an operation procedure of a controller according to the first exemplary embodiment.

The processing in steps S801 to S804 in FIG. 9B is similar to that in steps S301 to S304 in FIG. 4. A detailed description thereof will thus be omitted.

In step S804, the CPU 301 of the controller 300 transmits a second control command to the camera 100 via the network IF 304. The processing proceeds to step S805.

In step S805, the CPU 301 transmits information indicating that the joystick is operated and the second control command based on the operation is transmitted to the camera 100, to the workstation 200 via the network IF 304. The information transmitted here is used for the determination in the foregoing step S707 of FIG. 9A. The workstation 200 determines the presence or absence of the camera operator's operation based on this information.

As described above, the automatic tracking operation is stopped if the camera operator's camera operation is detected within a predetermined time after the workstation 200 starts the object tracking processing in response to a start of movement of the object. This enables the automatic tracking function to operate in a secondary manner while the camera operator's manual control plays a predominant role.

If the camera operator's operation is not detected within the predetermined time, the imaging direction of the camera 100 is restored to the position before the detection of the start of movement. An appropriate video image better reflecting the camera operator's intention can thus be captured. Further, the imaging direction does not necessarily need to be fully restored to the original position.

The assist mode according to the present exemplary embodiment is different from that of the first exemplary embodiment in the following two points. One is that the automatic tracking state transitions to the manual control state if a manual control is detected during the automatic tracking state. The other is that the imaging direction is restored if no manual control is detected during the automatic tracking state. However, both of the points do not necessarily need to be implemented. The automatic tracking state may transition to the manual control state upon detection of a manual control during the automatic tracking state while the imaging range is not restored even if no manual control is detected.

In the present exemplary embodiment, the pan and tilt tracking control is described as a camera operation for preventing the object from going out of the frame in step S703 of FIG. 9A. However, such a method is not restrictive. For example, the likelihood of the object going out of the frame may be reduced by moving the imaging angle of view to wider angles to zoom out in response to a start of movement of the object.

The workstation 200 may control the zoom-out processing of the camera 100 during the processing of step S705 in FIG. 9A. After the determination processing of step S706, the workstation 200, in step S708, may control the camera 100 to zoom in to the telephoto side up to the zoom ratio before the zoom-out processing. The workstation 200 may reduce the likelihood of frame-out by combining the pan, tilt, and zoom-out operations.

Modifications

In the first to third exemplary embodiments, the examples in which the camera 100 is manually controlled using the controller 300 intended for remote control have been described. However, the controller 300 may be constituted by an ordinary personal computer (PC), control application software running on the PC, and a joystick controller connected to the PC.

In the first to third exemplary embodiments, the examples in which the automatic tracking control of the camera 100 is implemented by the workstation 200. However, such a configuration is not restrictive. For example, some or all of the functions of the workstation 200 may be included in the camera 100.

While the exemplary embodiments of the present disclosure have been described above, the present disclosure is not limited to such exemplary embodiments, and various changes and modifications can be made without departing from the gist thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-111883, filed Jul. 12, 2022, and No. 2022-148289, filed Sep. 16, 2022, which are hereby incorporated by reference herein in their entirety.

What is claimed is:

1. A control apparatus comprising:
one or more memories storing instructions; and
one or more processors that, upon execution of the instructions, configures the one or more memories to operate as:
an input unit that receives an image from a camera;
a first detection unit configured to detect an object from the received image;
a second detection unit configured to detect a start of movement of the detected object; and
a control unit configured to, in a case where the start of movement is detected, control an imaging range of an imaging apparatus based on a position of the detected object for a predetermined time that is determined based on an obtained communication time between the imaging apparatus and an external apparatus, and stop controlling the imaging range based on the position of the detected object after a lapse of the predetermined time.

2. The control apparatus according to claim 1, further comprising a setting receiving unit configured to receive a time setting, wherein the predetermined time is determined based on the communication time and the received time setting.

3. The control apparatus according to claim 1, wherein in a case where the control apparatus is connected to an external apparatus configured to control the imaging range of the imaging apparatus, a communication time with the external apparatus is obtained and the predetermined time is determined based on the communication time.

4. The control apparatus according to claim 1, further comprising third detection unit configured to, in a case where the control apparatus is connected to an external apparatus configured to control the imaging range of the imaging apparatus, detect output of a control instruction from the external apparatus to the imaging apparatus,
wherein in a case where the output of the control instruction from the external apparatus is detected before the predetermined time elapses, control of the imaging range based on the position of the object detected by the detection unit is stopped.

5. The control apparatus according to claim 4, further comprising a communication unit configured to communicate with the external apparatus,
wherein the third detection unit is configured to inquire about information indicating whether the control instruction is output from the external apparatus to the imaging apparatus via the communication unit, and perform detection based on the information received.

6. The control apparatus according to claim 1, further comprising third detection unit configured to, in a case where the control apparatus is connected to an external apparatus configured to control the imaging range based on a user's operation, detect input of the user's operation to the external apparatus,
wherein in a case where the input of the user's operation is detected before the predetermined time elapses, control of the imaging range based on the position of the object detected by the first detection unit is stopped.

7. The control apparatus according to claim 6, further comprising a communication unit configured to communicate with the external apparatus,
wherein the third detection unit is configured to receive information indicating whether the user's operation to change the imaging range is input to the external apparatus via the communication unit, and perform detection based on the information.

8. The control apparatus according to claim 7, wherein the third detection unit is configured to request the external apparatus to transmit information indicating whether a camera operation is made on the external apparatus via the communication unit.

9. The control apparatus according to claim 1, wherein the control unit is configured to, in a case where the start of movement of the object is detected by the second detection unit at timing when the received image is an image corresponding to a first range, and the control unit controls the imaging range based on the position of the detected object until the predetermined time elapses, stop controlling the imaging range based on the position of the detected object after the predetermined time elapses, and control the imaging range so that the imaging range approaches the first range.

10. The control apparatus according to claim 1, wherein the control unit is configured to control the imaging range by performing at least either an imaging direction control to control an imaging direction of the imaging apparatus in a pan direction or a tilt direction or an angle of view control to control an imaging angle of view to a wide angle side or a telephoto side.

11. An imaging apparatus comprising:
an imaging unit configured to capture an image of an object;
a driving unit configured to change a direction in which the imaging unit captures the image; and
the control apparatus according to claim 1.

12. An imaging system comprising:
an imaging apparatus;
a first control apparatus; and
a second control apparatus,
wherein the first control apparatus includes one or more memories storing instructions; and one or more processors that, upon execution of the instructions, configures the one or more processors of the first control apparatus to operate as
an input unit to which an image captured by the imaging apparatus is input,
a first detection unit configured to detect an object from the image input in the input unit,
a second detection unit configured to detect a start of movement of the object detected by the first detection unit, and
a control unit configured to, in a case where the start of movement is detected by the second detection unit, control an imaging range of the imaging apparatus based on a position of the object detected by the first detection unit,
wherein the second control apparatus includes an operation receiving unit configured to receive a user's operation on the imaging apparatus, and
wherein the control unit is configured to, in a case where the start of movement of the object is detected by the second detection unit, control the imaging range based on the position of the object detected by the first detection for a predetermined time until first timing, and stop controlling the imaging range based on the position of the object detected by the first detection unit after the first timing, the first timing being an earlier of timing when a predetermined time elapses and timing when the user's operation is received by the operation receiving unit, wherein the predetermined time is determined based on an obtained communication time between the imaging apparatus and an external apparatus.

13. The imaging system according to claim 12,
wherein execution of the stored instructions by the one or more processors of the first control apparatus causes the one or more processors to operate as a detection unit configured to detect the user's operation,
wherein the first control apparatus and the second control apparatus are configured to communicate with each other, and
wherein after the user's operation is received by the operation receiving unit, information indicating receipt of the user's operation is transmitted to the detection unit.

14. The imaging system according to claim 12, wherein the imaging apparatus and the first control apparatus are integrally configured.

15. A control method for a control apparatus, comprising:
inputting an image;
detecting an object from the input image as a first detection;
detecting a start of movement of the object detected in the first detection as a second detection; and
in a case where the start of movement is detected in the second detection, controlling an imaging range of an imaging apparatus based on a position of the object detected in the first detection,
wherein in a case where the start of movement of the object is detected, the imaging range is controlled based on the position of the object detected in the first detection for a predetermined time that is determined based on an obtained communication time between the imaging apparatus and an external apparatus, and control of the imaging range based on the position of the object detected in the first detection is stopped after a lapse of the predetermined time.

16. A control method for an imaging system including an imaging apparatus, a first control apparatus, and a second control apparatus, the control method comprising:
the first control apparatus
inputting an image captured by the imaging apparatus,
detecting an object from the input image as a first detection,
detecting a start of movement of the object detected in the first detection as a second detection, and
in a case where the start of movement is detected in the second detection, controlling an imaging range of the imaging apparatus based on a position of the object detected in the first detection; and
the second control apparatus receiving a user's operation on the imaging apparatus,
wherein in a case where the start of movement of the object is detected in the second detection, the imaging range is controlled based on the position of the object detected in the first detection for a predetermined time until first timing, and control of the imaging range based on the position of the object detected in the first detection is stopped after the first timing, the first timing being an earlier of timing when a predetermined time elapses and timing when the user's operation is received, wherein the predetermined time is determined based on an obtained communication time between the imaging apparatus and an external apparatus.

* * * * *